Oct. 22, 1940.  E. O. SCHWEITZER, JR  2,218,859
DYNAMOELECTRIC DEVICE
Filed June 26, 1939  2 Sheets-Sheet 1
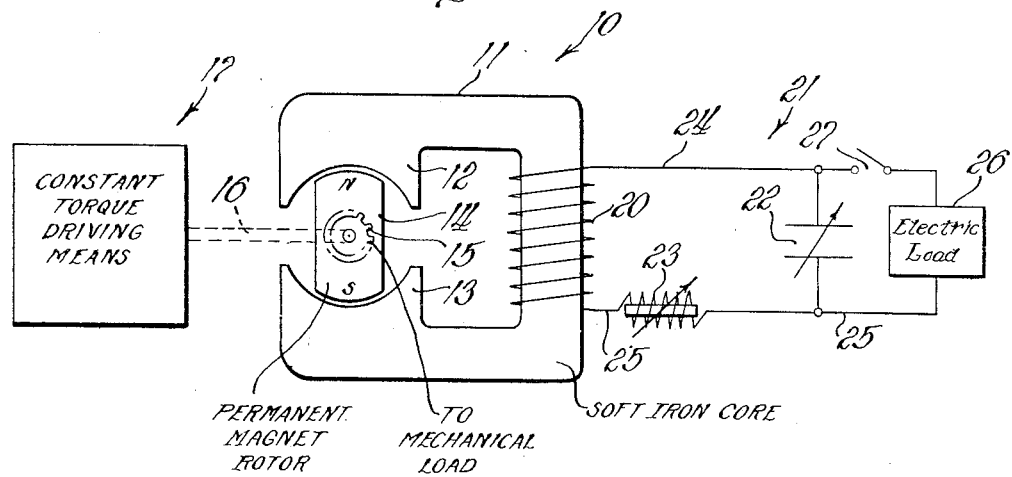
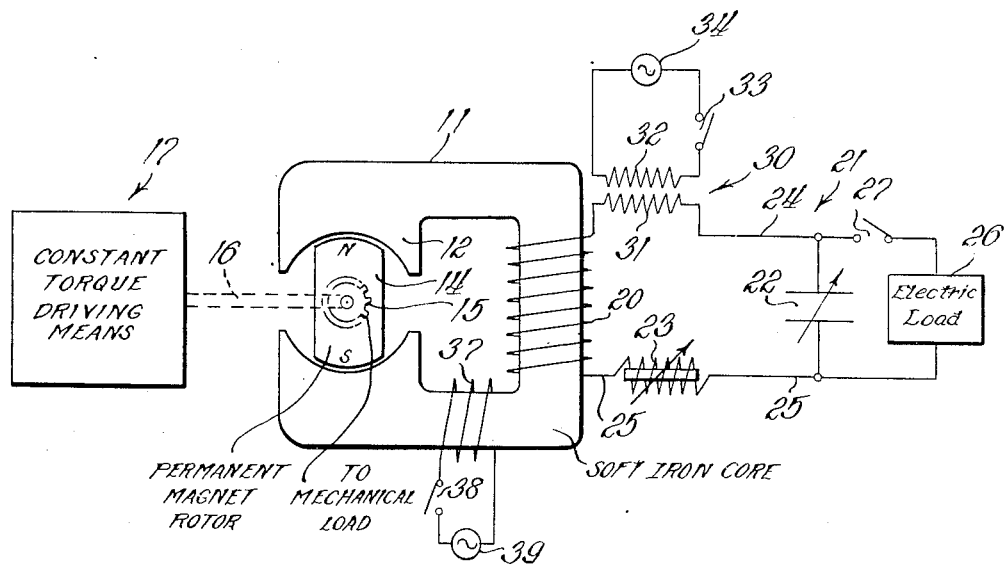
Inventor:
Edmund O. Schweitzer, Jr.
By Brown, Jackson, Boettcher & Dienner
Attys.

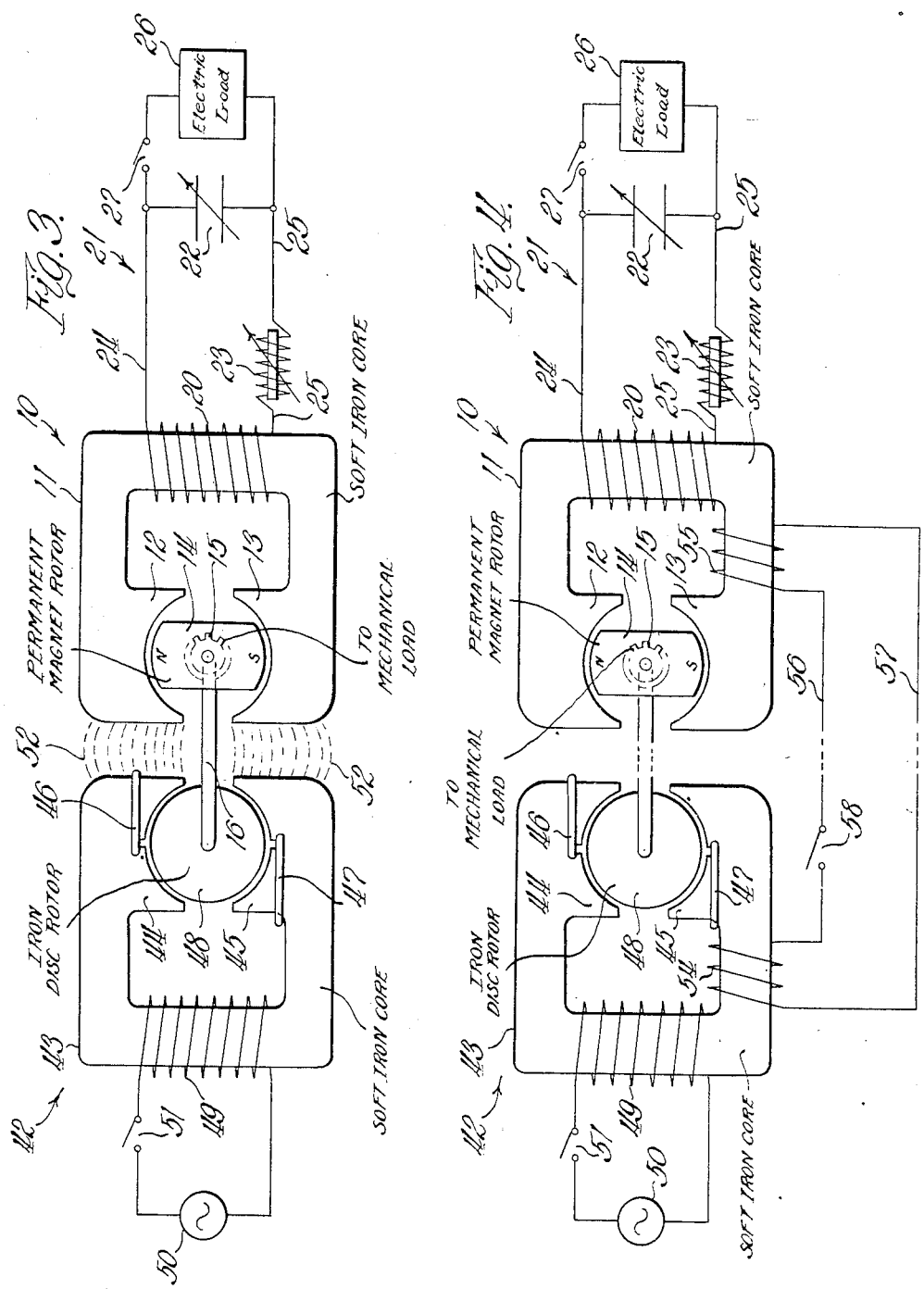

Patented Oct. 22, 1940

2,218,859

UNITED STATES PATENT OFFICE 2,218,859

DYNAMOELECTRIC DEVICE

Edmund O. Schweitzer, Jr., Northbrook, Ill.

Application June 26, 1939, Serial No. 281,176

14 Claims. (Cl. 171—119)

My invention relates, generally, to dynamoelectric devices and it has particular relation to synchronously operated dynamoelectric devices.

An object of my invention is to provide for operating a dynamoelectric device at widely varying synchronous speeds in a new and improved manner.

Another object of my invention is to provide for energizing an electric load with predetermined frequencies over a wide range and/or to drive a mechanical load at predetermined speeds over a wide range.

Still another object of my invention is to employ a resonant circuit for controlling the speed at which a dynamoelectric device operates.

A further object of my invention is to introduce alternating current into the resonant circuit in such a manner that the frequency of the current therein is a whole multiple of the frequency of the alternating current. By use of the term "whole multiple" herein, it is intended to refer to a whole number as a multiplier of the frequency of the resonant circuit or of the frequency of the alternating current, whichever frequency is the lesser.

A still further object of my invention is to provide for varying the resonant frequency of a resonant circuit connected to a dynamoelectric device for varying the speed at which the device operates.

Other objects of my invention will, in part, be obvious and in part appear hereinafter.

My invention, accordingly, is disclosed in the embodiments thereof in the accompanying drawings, and it comprises the features of construction, the combination of elements and arrangement of parts which will be exemplified in the constructions hereinafter set forth, and the scope of the application of which will be indicated in the appended claims.

For a more complete understanding of the nature and scope of my invention, reference may be had to the following detailed description, taken in connection with the accompanying drawings, in which:

Figure 1 illustrates, diagrammatically, one embodiment of my invention;

Figure 2 illustrates diagrammatically another embodiment of my invention in which means are provided for introducing an alternating current component into the resonant circuit;

Figure 3 illustrates diagrammatically a further embodiment of my invention and shows a hysteresis motor juxtaposed with the dynamoelectric device in such manner that the core of the latter is in the magnetic leakage field of the former; and Figure 4 illustrates still another embodiment of the invention in which the coupling between the cores of the device as shown in Figure 3 is obtained by means of windings thereon that are electrically interconnected.

Referring now particularly to Figure 1 of the drawings, it will be observed that the reference character 10 designates, generally, a dynamoelectric device provided with a generally C-shaped core of magnetic material, such as soft iron, and that it has pole portions 12 and 13 projecting toward each other. A rotor 14 is suitably rotatably mounted between the pole members 12 and 13 and is preferably formed of such material as to provide a permanent magnet having the poles as indicated. It will be understood that the rotor 14, by virtue of its permanent magnetic poles, provides a polar construction.

Mounted for rotation with the rotor 14 is a pinion 15 to which it will be understood a mechanical load can be connected.

The rotor 14 and the pinion 15 are suitably mounted for rotation with a shaft 16.

The shaft 16 may be driven by any suitable means, such as the constant torque driving means designated generally at 17. As will hereinafter appear, the constant torque driving means 17 may comprise a hysteresis motor. In a motor of this type the torque is independent of its speed. When a motor of this type is arranged to drive a dynamoelectric device of the type described herein, its speed and thereby the speed at which the rotor 14 is rotated, is determined by certain electrical characteristics which will be presently set forth. A direct current motor can also be used.

On the core 11 there is provided a main winding 20 which forms a part of a resonant circuit, shown generally at 21, and including a variable capacitor 22 and a variable inductor 23. Conductors 24 and 25 are connected to the main winding 20, the capacitor 22 being connected across the conductors 24 and 25 and the inductor 23 being connected in the conductor 25 so that the capacitor 22, inductor 23 and main winding 20 are connected in series circuit relation. The frequency at which the circuit 21 is set to resonate controls the speed at which the rotor 14 is driven by the constant torque driving means 17. This operation will be apparent when it is recalled that the rotor 14 having the polar construction serves to generate an alternating voltage in the main winding 20. On one half cycle of the alternating current the capacitor 22 will be charged at a rate which depends upon the period of the circuit in which it is connected. During the next half cycle if there is a difference in phase between the generated current and the discharge of the capacitor 22, the rotor 14 will be accelerated or decelerated in accordance with whether it has been behind or ahead of the period of the resonant circuit 21. Therefore, the rotor 14 will revolve at such a speed that its period will coincide with the frequency at which the circuit 21 is set to resonate.

As shown, the capacitor 22 and the inductor 23 are arranged to be adjustable so that the frequency at which the circuit 21 is adapted to resonate can be varied over a range which depends upon the range of variable capacitance of the capacitor 22 and the range of variable inductance of the inductor 23.

It will be understood that the conductors 24 and 25 will have applied thereto a frequency which is the resonant frequency of the circuit 21. An electric load 26 may be connected by a switch 27 for energization across the conductors 24 and 25 and, when so connected, it will be operated at this frequency.

It will now be obvious that the speed at which a mechanical load is driven through the pinion 15 and that the frequency which is applied for energizing the electric load 26 are variable over a wide range by adjusting the capacitor 22 and the inductor 23. However, for any given adjustment of these devices, the speed at which the mechanical load is driven and the frequency at which the electric load 26 is energized are fixed, the speed at which the mechanical load is driven being a function of the frequency at which the circuit 21 is set to resonate and the frequency applied to the electric load 26 being now, of course, this same frequency.

In Figure 2 of the drawings I have shown how the frequency in the resonant circuit 21 can be controlled by being keyed to the frequency of an outside source so that it will bear a definite relation thereto. One manner of effecting this result is to provide a transformer, shown generally at 30, having a secondary winding 31 which is connected in series circuit relation between the main winding 20 and the resonant circuit 21 and a secondary winding 32. It will be observed that the primary winding 32 is connected through a switch 33 to a source 34 of alternating current. This source 34 may be any suitable alternating current source such as a commercial 60 cycle source.

When the switch 33 is closed and the frequency of the source 34 is introduced through the transformer 30 into the resonant circuit 21, the frequency of the current in the latter will always be a whole multiple of the frequency of the alternating current source 34. For example, if the frequency generated in the main winding 20 would be either 29 cycles or 31 cycles per second with the switch 33 open, then the frequency generated in the main winding 20 would be 30 cycles with the switch 33 closed, assuming that the source 34 is a 60 cycle source.

In Figure 2 of the drawings there is also shown another arrangement whereby an alternating current component of predetermined standard frequency can be introduced into the circuit. This is accomplished by providing an auxiliary winding 37 on the core 11 and connecting it through a switch 38 to a source 39 of alternating current which, it will be understood, can be a 60 cycle source. When the switch 38 is closed, the alternating component of fixed frequency will be introduced into the circuit in a manner similar to that described hereinbefore on closure of the switch 33.

In Figure 3 of the drawings, the reference character 42 designates, generally, a hysteresis type motor which, as previously indicated, constitutes a constant torque driving means for the rotor 14 of the dynamoelectric device 10. The motor 42 comprises a C-shaped core 43 of soft iron having pole members 44 and 45 extending toward each other. Shading windings 46 and 47 are provided for producing a shifting magnetic field. A rotor 48 in the form of an iron disc is provided between the pole members 44 and 45 and is mounted on the shaft 16 for driving the same. A main winding 49 is provided on the core 43 and is connected for energization to a source 50 of alternating current, which may be a 60 cycle source. As shown, the main winding 49 may be connected for energization to the source 50 through a switch 51.

On closure of the switch 51 the rotor 48 will have applied thereto a torque tending to rotate it as a result of the shifting magnetic field caused, in part, by the shading windings 46 and 47. The rotor 14 will be rotated likewise, the speed of rotation of the rotors 14 and 48 being determined by the frequency of the current in the resonant circuit 21.

If it is desired to key the speed of rotation of the rotors 14 and 48 to the frequency of the alternating current source 50, then the cores 11 and 43 are juxtaposed so that the magnetic leakage flux from the former, as indicated at 52, links the latter, thereby causing an alternating current component to be induced in the main winding 20, the frequency of which is the same as the frequency of the alternating current source 50.

In Figure 4 of the drawings, it will be observed that the cores 11 and 43 are provided respectively with auxiliary windings 54 and 55, which are interconnected by conductors 56 and 57 through a switch 58. In the construction shown in Figure 4, the cores 11 and 43 are not juxtaposed if it is desired that, under certain conditions, the speed of rotation of the rotor 14 be controlled solely by the resonant circuit 21 and not keyed to the frequency of some outside alternating current source. If they are juxtaposed, then the auxiliary windings 54 and 55, when interconnected, provide a still closer coupling therebetween or a looser coupling, if one of the auxiliary windings is reversed.

It will be understood that, in closure of the switch 58, an alternating current component will be induced in the main winding 20 of the dynamoelectric device 10, the frequency of which is the same as the frequency of the alternating current source 50.

Since certain further changes may be made in the foregoing constructions and different embodiments of the invention can be made without departing from the scope thereof, it is intended that all matter contained in the above description or shown in the accompanying drawings shall be interpreted as illustrative and not in a limiting sense.

I claim as my invention:

1. A dynamoelectric device comprising, in combination, relatively rotatable cooperating primary and secondary members, said primary member including a polar construction having a plurality of poles of predetermined polarity, winding means on said secondary member, and resonant circuit means including said winding means, the speed of relative movement of said primary and secondary members in revolutions per second being equal to the resonant frequency of said resonant circuit in cycles per second divided by one-half the number of said poles.

2. A dynamoelectric device comprising, in combination, relatively rotatable cooperating primary and secondary members, said primary member including a polar construction having a plurality of poles of predetermined polarity, winding means on said secondary member, resonant circuit means including said winding means, the speed of relative movement of said primary and secondary members in revolutions per second being equal to the resonant frequency of said resonant circuit in cycles per second divided by one-half the number of said poles, and means for connecting an electric load to said resonant circuit means for energization of the same at said resonant frequency.

3. A dynamoelectric device comprising, in combination, relatively rotatable cooperating primary and secondary members, said primary member including a polar construction having a plurality of poles of predetermined polarity, winding means on said secondary member, resonant circuit means including said winding means, the speed of relative movement of said primary and secondary members in revolutions per second being equal to the resonant frequency of said resonant circuit in cycles per second divided by one-half the number of said poles, and means for connecting a mechanical load to said primary member for operating the same at a speed which is a function of said resonant frequency.

4. A dynamoelectric device comprising, in combination, relatively rotatable cooperating primary and secondary members, said primary member including a polar construction having a plurality of poles of predetermined polarity, winding means on said secondary member, resonant circuit means including said winding means, the speed of relative movement of said primary and secondary members in revolutions per second being equal to the resonant frequency of said resonant circuit in cycles per second divided by one-half the number of said poles, means for connecting an electric load to said resonant circuit means for energization of said load at said resonant frequency, and means for connecting a mechanical load to said primary member for operating the same at a speed which is a function of said resonant frequency.

5. A synchronously operating device the synchronous speed of which is capable of being varied comprising, in combination, constant torque driving means, a rotor driven by said driving means including a polar construction having a plurality of poles of predetermined polarity, a stator including a core in cooperative relationship to said rotor and a winding thereon, and a resonant circuit including said winding and means for varying its resonant frequency, the speed of rotation of said rotor in revolutions per second being equal to the frequency at which said circuit is adapted to resonate in cycles per second divided by one-half the number of said poles and being constant so long as the resonant frequency remains the same.

6. A synchronously operating device the synchronous speed of which is capable of being varied over a wide range comprising, in combination, a constant torque motor, a permanent magnet rotor driven by said motor, a stator including a core of magnetic material in cooperative relation to said rotor and a winding thereon, and a resonant circuit having inductance and capacitance at least one of which is variable, the speed at which said rotor is driven being determined by the frequency at which said circuit is set to resonate and being equal in revolutions per second to the frequency in cycles per second at which the circuit is set to resonate divided by one-half the number of poles of said rotor and being constant so long as the resonant frequency remains constant.

7. A dynamoelectric device comprising, in combination, relatively rotatable cooperating primary and secondary members, said primary member including a polar construction having a plurality of poles of predetermined polarity, winding means on said secondary member, resonant circuit means including said winding means, the speed of relative movement of said primary and secondary members being determined by the resonant frequency of said resonant circuit, and means for coupling said resonant circuit means to an alternating current source having a predetermined frequency whereby the frequency of the current in said resonant circuit means and the frequency of said alternating current source have a whole multiple relationship.

8. In combination; a dynamoelectric device including, relatively rotatable cooperating primary and secondary members, said primary member including a polar construction having a plurality of poles of predetermined polarity, winding means on said secondary member, resonant circuit means including said winding means, and means for coupling said resonant circuit means to an alternating current source having a predetermined frequency whereby the frequency of the current in said resonant circuit means and the frequency of said alternating current source have a whole multiple relationship.

9. A synchronously operating device the synchronous speed of which is capable of being varied comprising, in combination, constant torque driving means, a rotor driven by said driving means including a polar construction having a plurality of poles of predetermined polarity, a stator including a core in cooperative relationship to said rotor and a winding thereon, a resonant circuit including means for varying its resonant frequency connected for energization to said winding, and means for coupling said resonant circuit means to an alternating current source having a predetermined frequency whereby the frequency of the current in said resonant circuit means and the frequency of said alternating current source have a whole multiple relationship.

10. A dynamoelectric device comprising, in combination, relatively rotatable cooperating primary and secondary members, said primary member including a polar construction having a plurality of poles of predetermined polarity, winding means on said secondary member, resonant circuit means including said winding means, the speed of relative movement of said primary and secondary members being determined by the resonant frequency of said resonant circuit, and circuit means for coupling said resonant circuit means to an alternating current source having a fixed frequency for introducing into the resonant circuit means an alternating component of said fixed frequency whereby there is a whole multiple relationship between the frequency of the current in the resonant circuit means and said fixed frequency.

11. A dynamoelectric device comprising, in combination, relatively rotatable cooperating primary and secondary members, said primary member including a polar construction having a plurality of poles of predetermined polarity, winding means on said secondary member, resonant circuit means including said winding means, the speed of relative movement of said primary and secondary members being determined by the resonant frequency of said resonant circuit, and additional winding means on said secondary member inductively related to said winding means thereon and connected for energization to an alternating current source having a fixed frequency for introducing into the resonant circuit means an alternating current component of said fixed frequency whereby there is a whole multiple relationship between the frequency of the current in the resonant circuit means and said fixed frequency.

12. A synchronously operating device the synchronous speed of which is capable of being varied over a wide range comprising, in combination, motor means adapted to be energized from an alternating current source and to have an alternating current magnetic leakage field around the same, a rotor driven by said motor means and including a polar construction having a plurality of poles of predetermined polarity, a stator including a core disposed in said magnetic leakage field and in cooperative relationship to said rotor and a winding thereon into which alternating current is induced the frequency of which is that of said alternating current source, and a resonant circuit including said winding and means for varying its resonant frequency, the frequency of the current in said resonant circuit and the frequency of said alternating current source having a whole multiple relationship and the speed of rotation of said rotor being a function of the frequency of the current in said resonant circuit.

13. A synchronously operating device the synchronous speed of which is capable of being varied over a wide range comprising, in combination, an alternating current motor including a first core of magnetic material with a winding thereon for connection to an alternating current source and a first rotor, a second rotor driven by said first rotor and including a polar construction having a plurality of poles of predetermined polarity, a second core of magnetic material juxtaposed with said first core and in cooperative relation with said second rotor and a winding thereon into which alternating current is induced the frequency of which is that of said alternating current source, and a resonant circuit including said winding and means for varying its resonant frequency, the frequency of the current in said resonant circuit and the frequency of said alternating current source having a whole multiple relationship and the speed of rotation of said rotor being a function of the frequency of the current in said resonant circuit.

14. A synchronously operating device the synchronous speed of which is capable of being varied over a wide range comprising, in combination, an alternating current motor including a first core of magnetic material with a first main winding thereon for connection to an alternating current source and a first rotor, a second rotor driven by said first rotor and including a polar construction having a plurality of poles of predetermined polarity, a second core of magnetic material in cooperative relation with said second rotor and a second main winding thereon, first and second auxiliary windings on said first and second cores respectively and circuit means interconnecting the same whereby alternating current of the frequency of said source is induced in said second main winding, and a resonant circuit including said second main winding and means for varying its resonant frequency, the frequency of the current in said resonant circuit and the frequency of said alternating current source having a whole multiple relationship and the speed of rotation of said rotor being a function of the frequency of the current in said resonant circuit.

EDMUND O. SCHWEITZER, Jr.